United States Patent
Cournoyer et al.

(10) Patent No.: US 7,023,001 B2
(45) Date of Patent: Apr. 4, 2006

(54) METHOD FOR ENGRAVING MATERIALS USING LASER ETCHED V-GROOVES

(75) Inventors: Alain Cournoyer, Québec (CA); Marc Lévesque, Saint-Augustin-de-Desmaures (CA); Luc Lévesque, Sainte-Foy (CA)

(73) Assignee: Institut National D'Optique, Quebec (CA)

( * ) Notice: Subject to any disclaimer, the term of this patent is extended or adjusted under 35 U.S.C. 154(b) by 0 days.

(21) Appl. No.: 10/404,249

(22) Filed: Mar. 31, 2003

(65) Prior Publication Data

US 2004/0188398 A1 Sep. 30, 2004

(51) Int. Cl.
*H05H 3/00* (2006.01)

(52) U.S. Cl. .............................. 250/492.1; 219/121.69; 219/121.68

(58) Field of Classification Search ............... 250/492.1
See application file for complete search history.

(56) References Cited

U.S. PATENT DOCUMENTS

| | | | |
|---|---|---|---|
| 4,443,684 A * | 4/1984 | Sakuragi et al. | 219/121.68 |
| 5,226,101 A | 7/1993 | Szentesi et al. | 385/85 |
| 5,317,661 A | 5/1994 | Szentesi et al. | 385/31 |
| 5,421,928 A * | 6/1995 | Knecht et al. | 156/153 |
| 5,966,485 A | 10/1999 | Luther et al. | 385/85 |
| 6,246,026 B1 | 6/2001 | Vergeest | 219/121.72 |
| 6,413,450 B1 | 7/2002 | Mays, Jr. | 264/1.27 |
| 2002/0090493 A1* | 7/2002 | Kamada et al. | 428/156 |
| 2002/0170891 A1* | 11/2002 | Boyle et al. | 219/121.67 |

OTHER PUBLICATIONS

Markillie et al., "Effect of vaporization and melt ejection on laser machining of silica glass micro-optical components", Applied Optics (2002); 41(27): 5660-5667.

(Continued)

*Primary Examiner*—John R. Lee
*Assistant Examiner*—Phillip A. Johnston
(74) *Attorney, Agent, or Firm*—Merchant & Gould P.C.

(57) ABSTRACT

Disclosed is a method for engraving materials such as fused silica or ceramic by continuously actuating a laser producing a Gaussian beam, directing the beam towards the surface of the substrate and moving the beam relative to the surface of the substrate so that a V-groove is obtained by laser ablation of the substrate. The depth of the groove, the angle of the top of the groove, can be controlled by the relative speed between the laser beam and the substrate, the power density and the width of the laser beam, the polarization of the laser beam and the incident angle of the laser beam with respect to the surface. A method for treating an optical fiber connector is also disclosed.

10 Claims, 26 Drawing Sheets

OTHER PUBLICATIONS

Vadim P. Veiko, "Laser-assisted microshaping", Proceedings of SPIE (2001); 4157: 93-104.

Veiko et al., "Laser Technology for Producing Aspherical Optical Surfaces", Bulletin of the Russian Academy of Sciences (1997);61(8): 1226-1231.

Baker, H. et al., "Precision Laser Processing of Optical Microstructures with Slab Waveguide $CO_2$ Lasers," *High-Power Lasers in Manufacturing, Proceedings of SPIE*, vol. 3888, pp. 625-634 (2000).

Staupendahl, G. et al., "Laser Material Processing of Glasses with $CO_2$ Lasers," *SPIE*, vol. 3097, pp. 670-676 (1997).

Veiko, V., "Laser-assisted Microshaping: Fundamentals, Applications, Problems, and Prospects," *Bulletin of the Russian Academy of Sciences*, vol. 65, No. 6, pp. 999-1010 (2001).

* cited by examiner

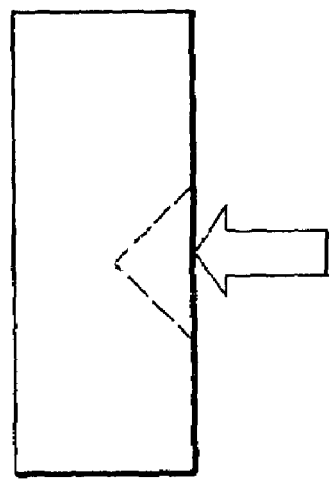
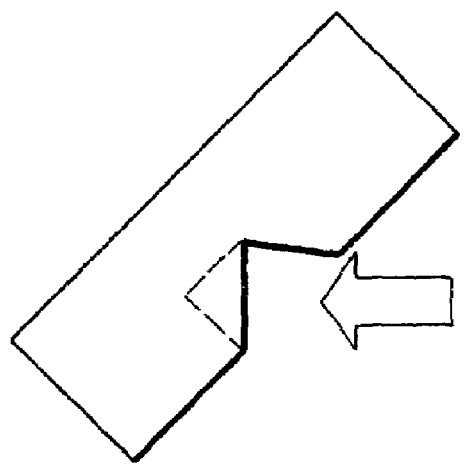
FIG. 9a  FIG. 9b
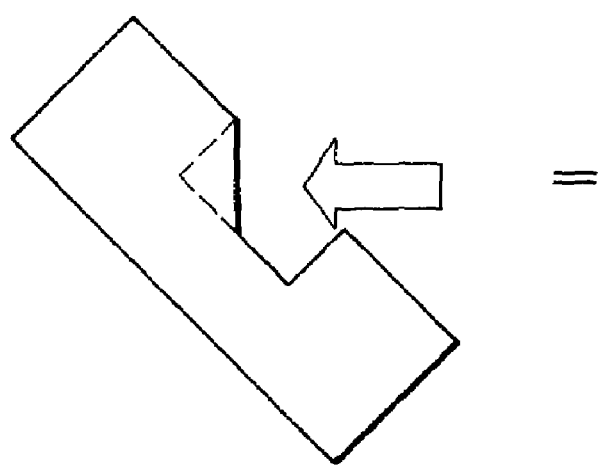
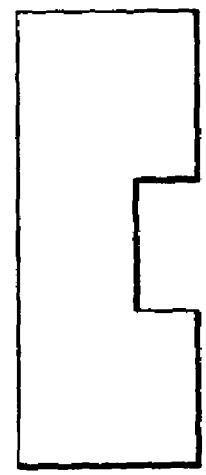
FIG. 9c  FIG. 9d

US 7,023,001 B2

METHOD FOR ENGRAVING MATERIALS USING LASER ETCHED V-GROOVES

FIELD OF THE INVENTION

The present invention relates to a method for engraving materials, such as fused silica and optical fibers, using laser etched V-grooves.

DESCRIPTION OF THE PRIOR ART

Cutting and sculpting optical fiber ends is becoming more and more useful for the development of industrial applications.

Known in the art is U.S. Pat. No. 6,246,026, which describes a process for cutting an optical fiber. The fiber is introduced into a holding and positioning device, and is cut by a pulsed laser beam. An advantage of this method is that all fibers of a ribbon cable are cut at the same angle with an equally high end-face quality.

However, the method described in this patent is not useful for engraving materials, such as fused silica and optical fibers.

There is thus a need for a method for engraving materials using laser etched V-grooves.

SUMMARY OF THE INVENTION

The present invention relates to a method and system for engraving materials using laser-etched V-grooves.

In accordance with the invention, this object is achieved with:
(a) providing a material to be engraved said material being isotropic and substantially amorphous;
(b) providing a laser device in an uncontrolled atmosphere, the beam of said laser device having a substantially Gaussian radial profile and being adapted to be moved at a selected speed relative to said material to be engraved and continuously activated with a selected power density and a selected Gaussian beam radius; and
(c) actuating said laser device and moving said laser beam at a predetermined speed relative to said material in order to provide at least one V-groove therein of a predetermined length, depth and width.

In accordance with another aspect of the invention, this object is achieved with:
(a) a holder for holding said material;
(b) a controllable laser device, the beam of said laser device being controllable at least in speed of the movement relative to the surface of the material to be engraved, orientation relative to the surface to be engraved, power density and beam radius, and possibly polarization; and
(c) means for controlling said laser device, whereby when said material is in said holder, at least one V-groove can be etched therein, the depth and angle at the top of said V-groove being obtained by controlling said laser device.

In accordance with a third aspect of the invention, this object is achieved with:
(a) providing an optical fiber connector having a ferrule, said ferrule having a face and an optical fiber extending therefrom, said optical fiber being held in said ferrule by any means known in the art, in particular with epoxy or any other glue, a residue of which might be present on said face;
(b) cutting said optical fiber near said face;
(c) providing a laser device, the beam of said laser device having a substantially Gaussian radial profile and being adapted to be moved at a selected speed relative to said material to be engraved and continuously activated with a selected power density and a selected Gaussian beam radius;
(d) directing the beam of said laser device towards said face of the ferrule at a normal incidence;
(e) actuating said laser device and moving the beam of said laser device relative to said face of the ferrule in order to selectively ablate the residue of epoxy if present on said face of the ferrule;
(f) directing the beam of said laser device towards said face of the ferrule at a normal incidence; and
(g) terminating said optical fiber connector by actuating said laser beam on the end face of said optical fiber protruding from the face of the ferrule in order to etch a plurality of V-grooves, so that almost no fiber projects from said face of the ferrule in order to provide a substantially planar surface.

BRIEF DESCRIPTION OF THE DRAWINGS

The patent or application file contains at least one photograph executed in color. Copies of this patent or patent application publication with color photograph(s) will be provided by the Office upon request and payment of the necessary fee.

The present invention and its advantages will be more easily understood after reading the following non-restrictive description of preferred embodiments thereof, made with reference to the following drawings in which:

FIG. 9 shows how the superposition of three V-grooves can be effected in such a way to produce a rectangular groove;

DESCRIPTION OF A PREFERRED EMBODIMENT OF THE INVENTION

Referring now to the Figures, and more particularly FIG. 1, the invention concerns the etching into a material of V-grooves. Preferably, the material to be etched is isotropic and generally amorphous, such as fused silica, fused quartz or silica glass, or a ceramic, and the V-groove is etched into the material using a laser device, and more preferably a $CO_2$ laser. It is important to note that if the invention is used with fused silica, the resulting surface of engraved fused silica is intrinsically polished.

Figure 1A:
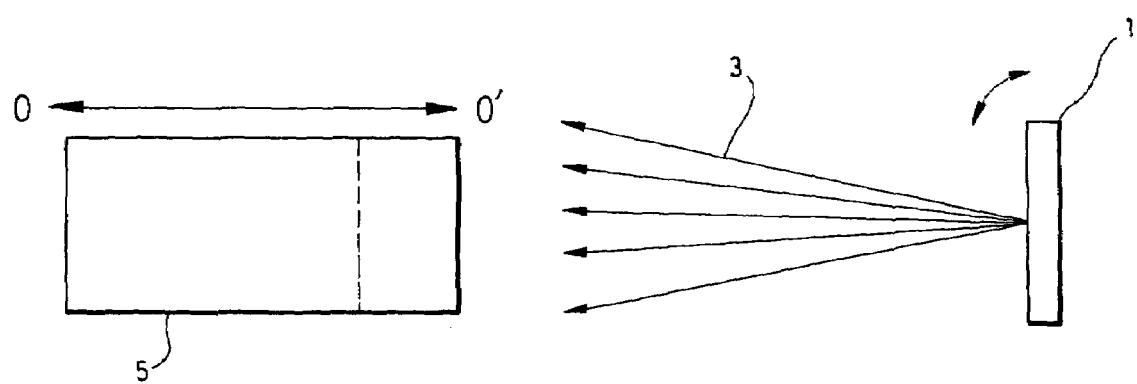
FIGS. 1a and 1b illustrate schematically one configuration of the method of the present invention for forming grooves into a substrate by relative movement of the laser beam and the substrate using an optical scanner.
Figure 1B:
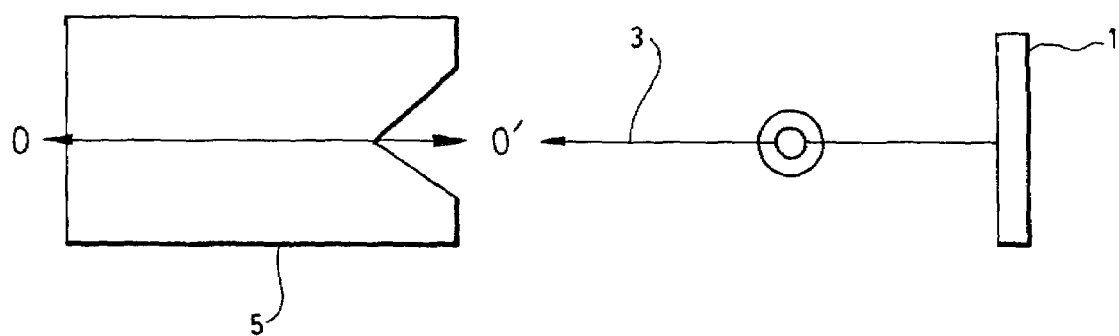

FIGS. 1a and 1b show schematically the underlying principle of the invention. A laser 1 produces a continuous Gaussian beam 3. The beam is directed to the surface of a substrate 5, and is moved relatively quickly with respect to the surface of the substrate using means well known in the art such as motorized translation stages or optical scanners. The V-groove is obtained by an ablation of the substrate. One important aspect of the invention is the speed at which the laser beam must be moved relative to the substrate. Experimentally, speeds of the order of 500 mm/s were used with $CO_2$ laser of 100 W having a beam diameter of approximately 150 µm.

It will be appreciated that the depth of the groove, as well as the angle at the top of the groove, are controlled by the relative speed between the laser beam and the substrate, the power density of the laser beam, the polarization of the laser and the incident angle of the laser beam with respect to the surface. Furthermore, the superposition of many V-grooves at the same lateral position results in a finished groove having a depth and an angle which can be controlled.

The invention thus provides for a precise and repeatable process for forming V-grooves into a substrate. An additional advantage is that the resulting structures are sharp since the radius of curvature of the groove is smaller than the width of the Gaussian laser beam (in the order of a few µm). This feature is one of the unexpected results of the invention. One would expect that the laser beam, which has a Gaussian profile, would etch a groove having a similar profile. However, experimental observations have shown that the grooves have a V-shape as shown experimentally in FIG. 2.

Figure 25:
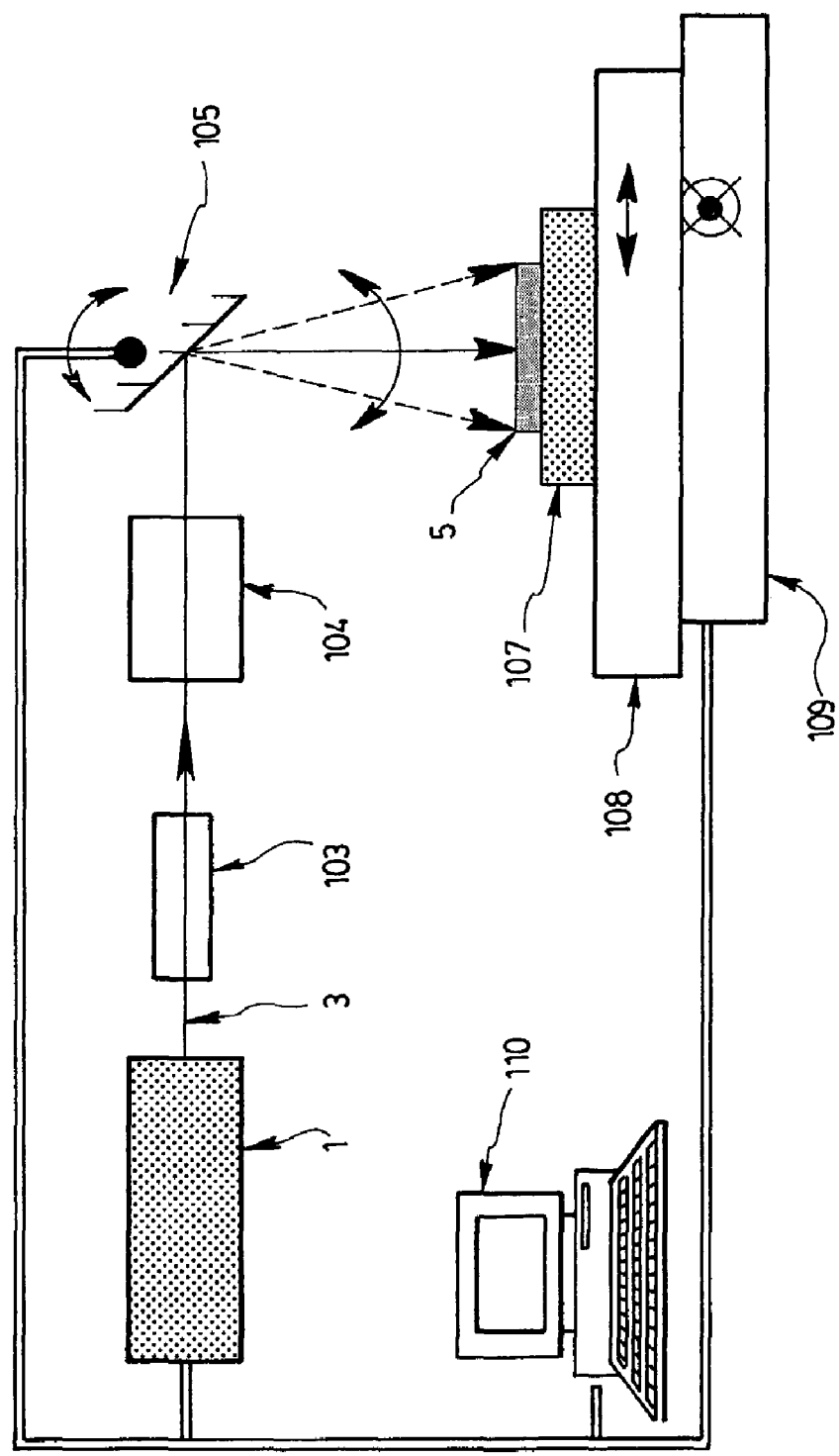
FIG. 25 is a schematic representation of a typical set-up for carrying out the method of the present invention.

Referring now to FIG. 25, there is shown a schematic representation of a set-up for carrying out the method of the present invention. One will note that no special chamber is provided, so that the invention is practiced in an uncontrolled atmosphere. Laser 1 produces a Gaussian laser beam 3 which is directed through an optical attenuator 103 and optical elements 104 towards optical scanner 105. Optical scanner has a controllable rotation speed if the relative movement of the beam and the substrate is produced that way. Otherwise, an adjustable mirror can be used in order to modify the angle of incidence of the laser beam on the substrate to be engraved 5. The substrate is placed on a holder 107. A controllable translation stage 108 may be present if the relative movement of the beam and the substrate is produced that way. Another controllable translation stage 109 having an orthogonal axis to control the lateral shifts of the V-grooves may also be provided. Of course, as will be appreciated by a person skilled in the art, a personal computer 110 or other electronic controller is provided for controlling the laser, the scanner and/or the translation stages.

Figure 2:
FIG. 2 is a photograph of a V-groove in fused silica obtained with the method shown in FIG. 1 of the present invention.
Figure 3:
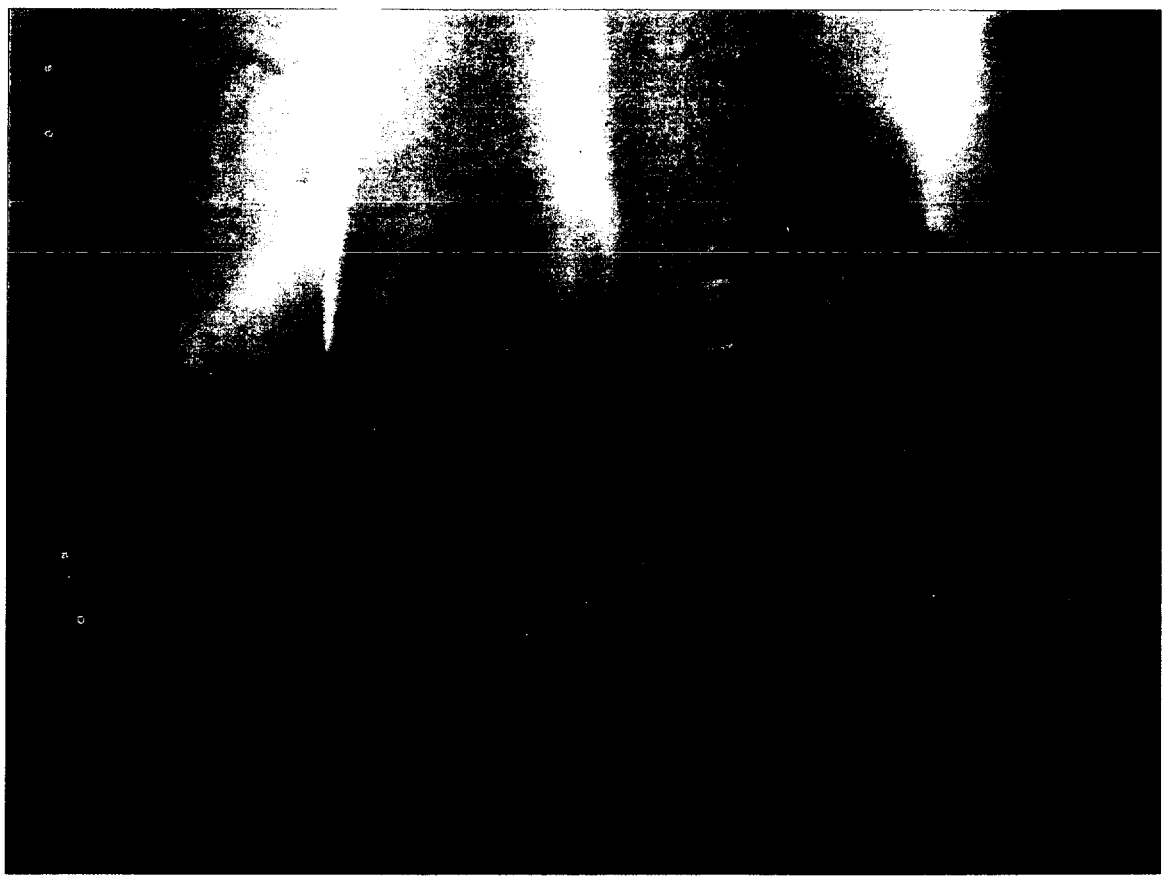
FIG. 3 is a photograph of superposed laterally shifted V-grooves in fused silica illustrating the possibility of engraving complex surface profiles using the method of the present invention.

As mentioned previously, FIGS. 1a and 1b show schematically the underlying principle of the invention. FIG. 2 is a photograph of a V-groove obtained on a fused silica substrate, whereas FIG. 3 shows the superposition of many laterally shifted V-grooves resulting in an engraved surface profiling of the fused silica substrate.

Figure 4A:
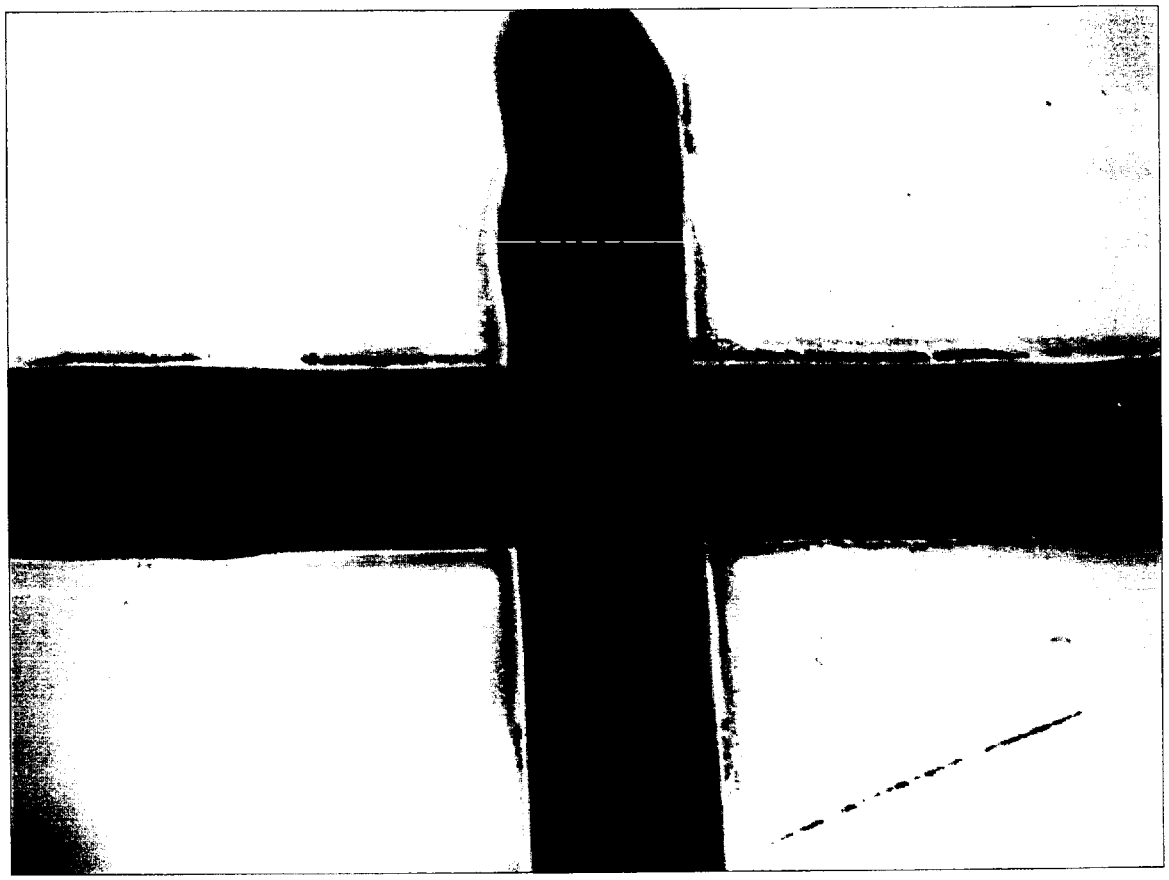
FIGS. 4a and 4b show respectively two perpendicular V-grooves on a fused silica substrate and the corner formed at the intersection of the two V-grooves.
Figure 4B:
Figure 5A:
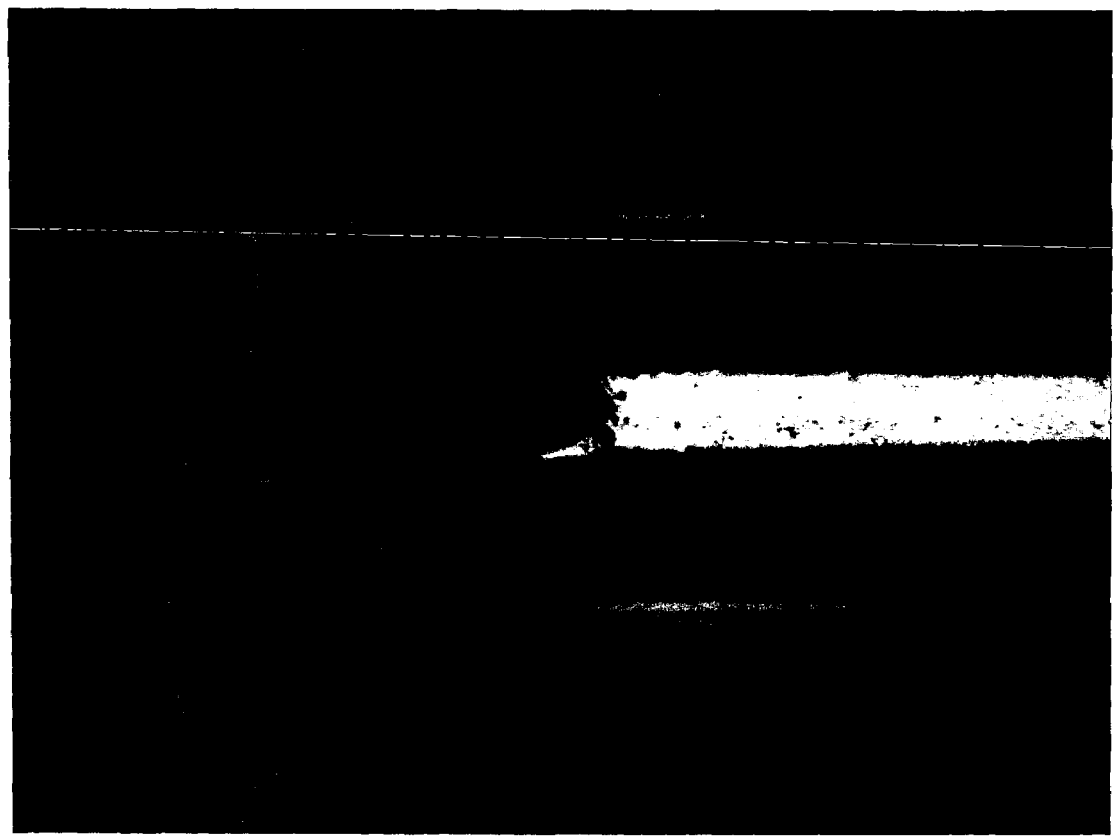
FIGS. 5a and 5b show a V-groove formed at the end of an optical fiber and the same optical fiber rotated by approximately 90°, respectively.
Figure 5B:

In order to illustrate the sharpness of the structures obtained by the process of the present invention, reference is made to FIGS. 4a and 4b. FIG. 4a shows two V-grooves at right angles to each other, and FIG. 4b shows one of the corners so obtained. A person skilled in the art will appreciate the sharpness of the corner.

Figure 6:
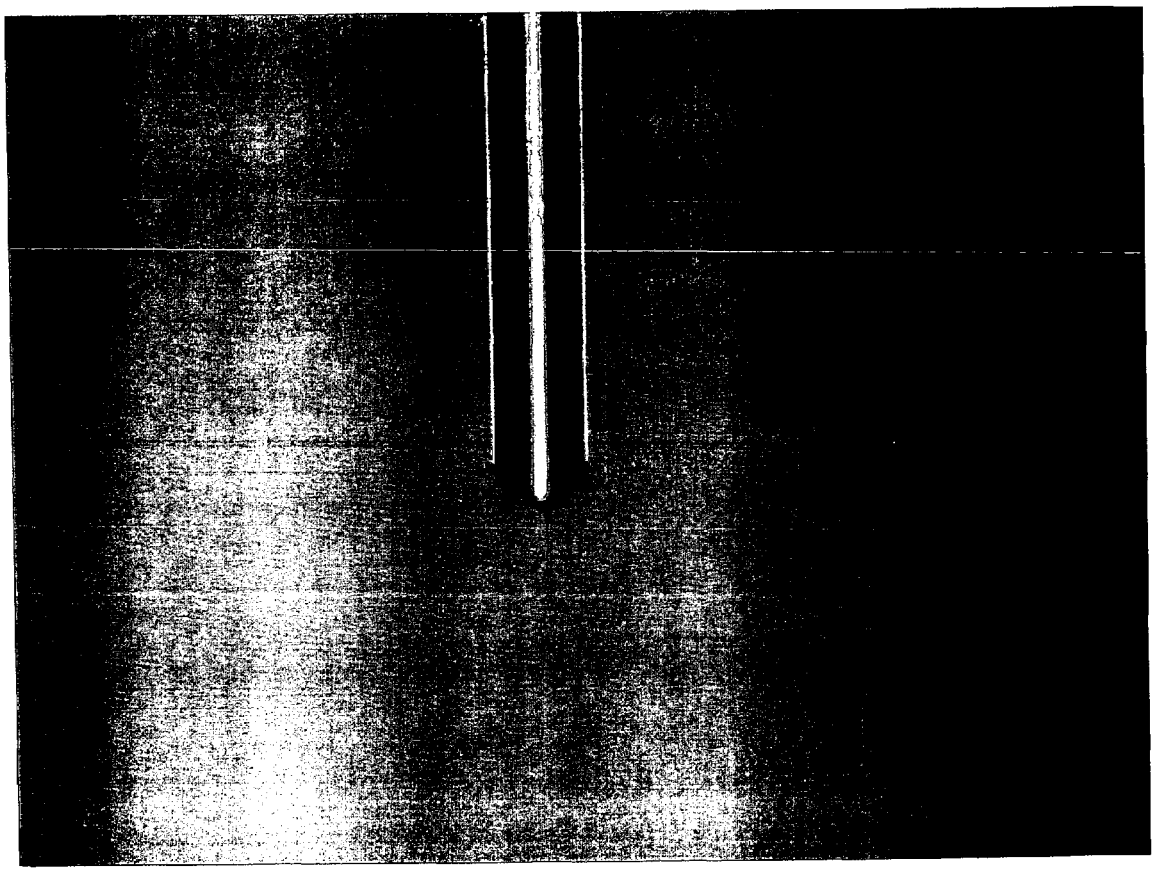
FIG. 6 shows a point (or "wedge") made at the tip of an optical fiber.

An example of the application of the method of the present invention is shown in FIGS. 5 to 8. In FIGS. 5a and 5b, the tip of an optical fibre is V-grooved transversely to the longitudinal axis. FIG. 5b shows the same fibre as in FIG. 5a, but rotated about the longitudinal axis. Interestingly, a point (or "wedge") can also be obtained with the method of the present invention. In FIG. 6, the tip is obtained by directing the laser along the arrows of FIG. 6. In effect, the tip is obtained by two half V-grooves that are laterally shifted.

Figure 7:
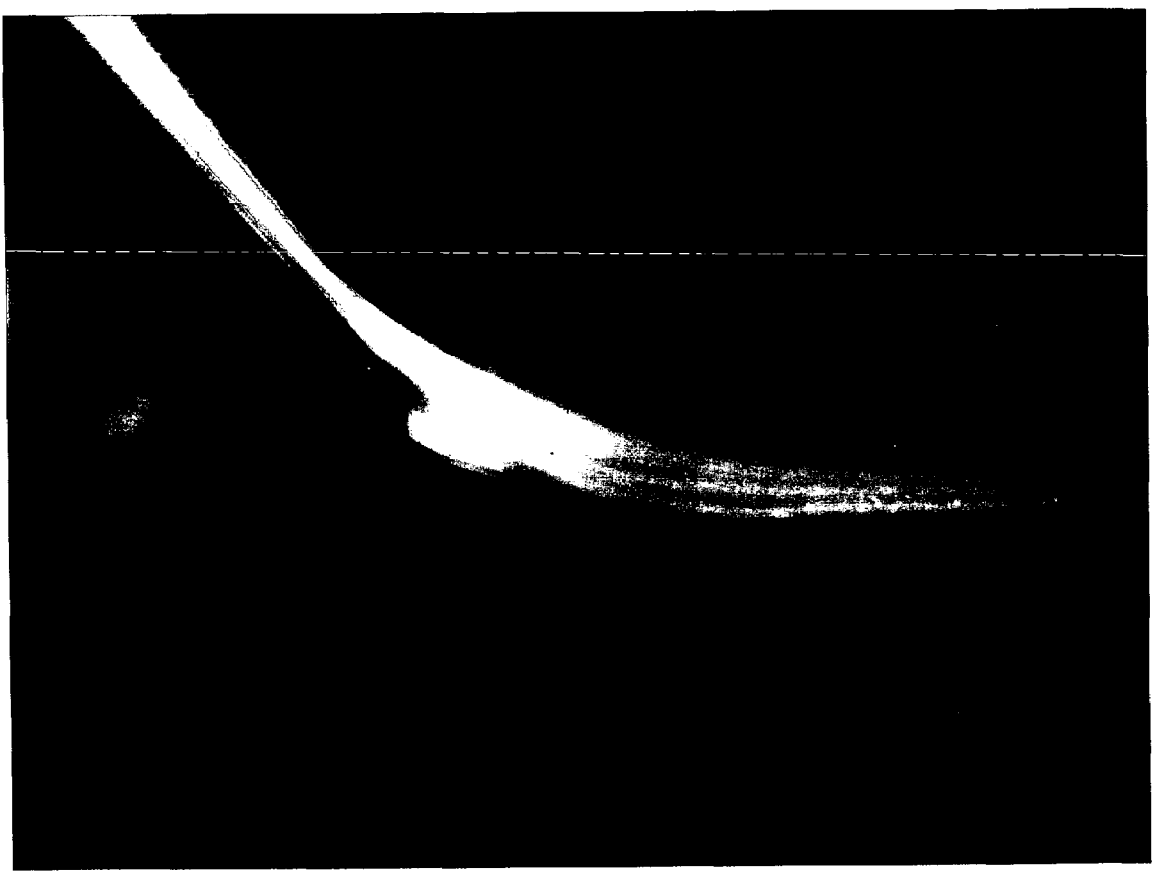
FIG. 7 shows the flattening of a bent fused silica optical fiber using the method of the present invention by superposing laterally shifted V-grooves.

FIG. 7 shows how a bent optical fiber can be flattened along one of the bends by many laterally shifted V-grooves.

Figure 8:
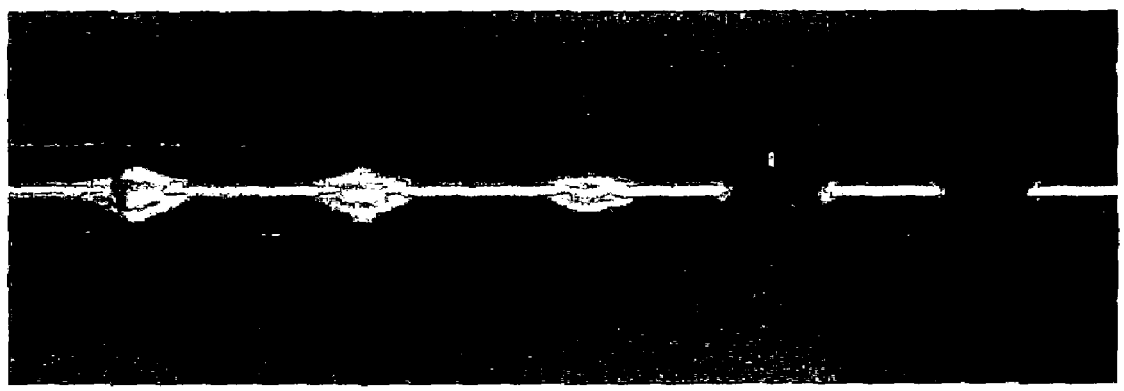
FIG. 8 shows the creation of V-grooves of varying depths in an optical fiber.

FIG. 8 shows transversal V-grooves of different depths in an optical fiber.

FIGS. 9a to 9d show how three V-grooves can be superposed to obtain a rectangular cross-section. The laser beam is first moved at a normal angle to the surface of the substrate (9a), then the process is repeated but now the substrate is rotated 45° clockwise (9b) and then the substrate is rotated counter-clockwise by 90° (9c). The resulting groove is U-shaped (9d). Of course, the direction of movement, and the order of the etching is not essential, and could be modified. Also, more than three grooves could be etched, depending on the particular needs. FIG. 9d shows the resulting U-shaped groove. One will also recognize that by superposing a plurality of V-grooves, and shifting them laterally, one can obtain arbitrary surface profiles.

Figure 10:
FIG. 10 is a photograph of the bottom of a rectangular groove in fused silica.
Figure 11:
FIG. 11 is a cross-section of the rectangular groove of FIG. 10.

In FIGS. 10 and 11, there is shown a 60 µm by 140 µm groove etched in a fused silica substrate, in plan and cross-sectional views respectively, both 100× the actual size.

Figure 12:
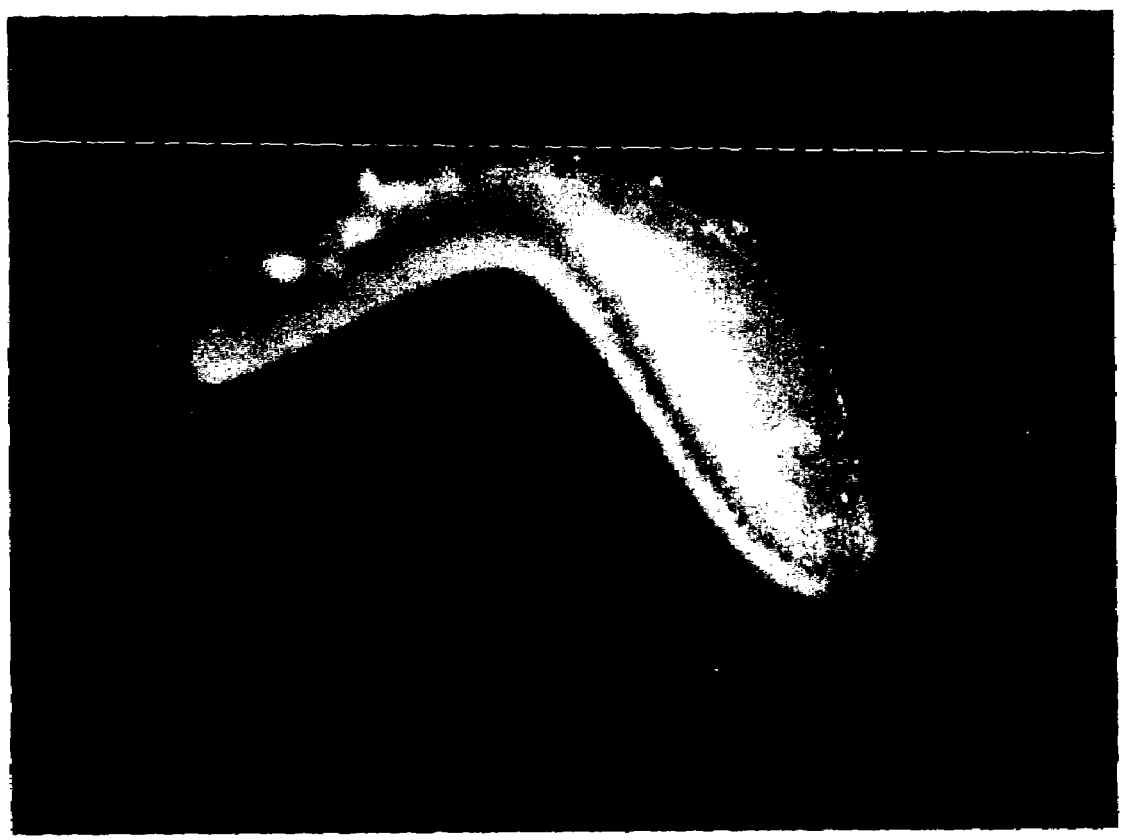
FIG. 12 is a cross-section of a longitudinal groove along an optical fiber.
Figure 13:
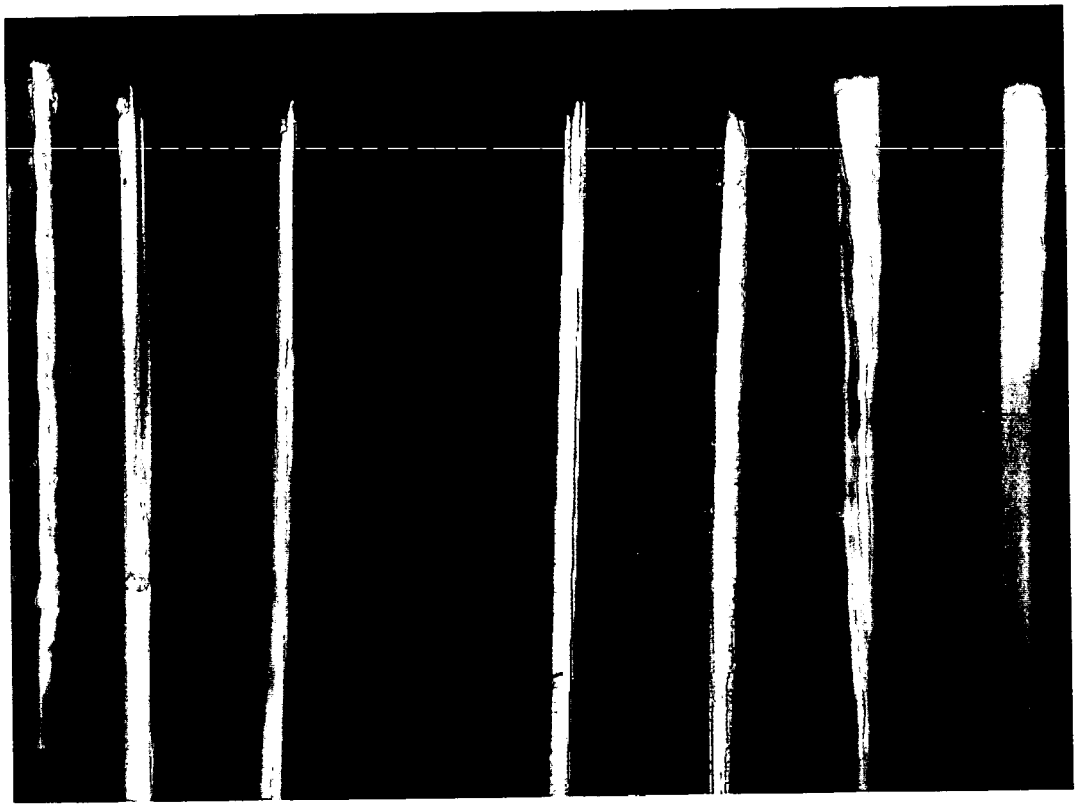
FIG. 13 illustrates plane views of longitudinal grooves along optical fibers using the method of the present invention.

In FIG. 12 and 13, an optical fiber has been modified to ablate along its length a V-groove. Such a configuration may be useful for some applications such as microoptics elements. Similarly, it may be desirable to flatten one side of an optical fiber, by superposing a plurality of shallow V-grooves, taking advantage of the initial convex side surface of the optical fiber, as illustrated in FIGS. 14, 15 and 16.

Figure 14:
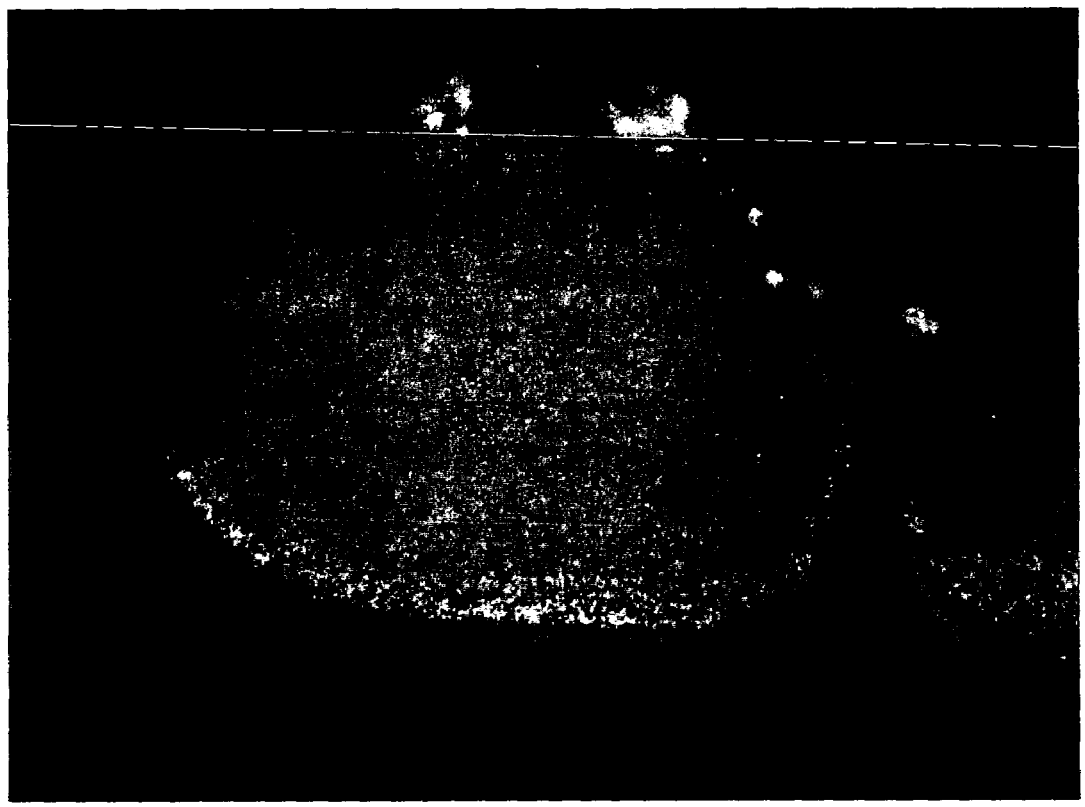
FIGS. 14, 15 and 16 show sectional and plane views of the fibers with flattened sides obtained with the method of the present invention.
Figure 15:
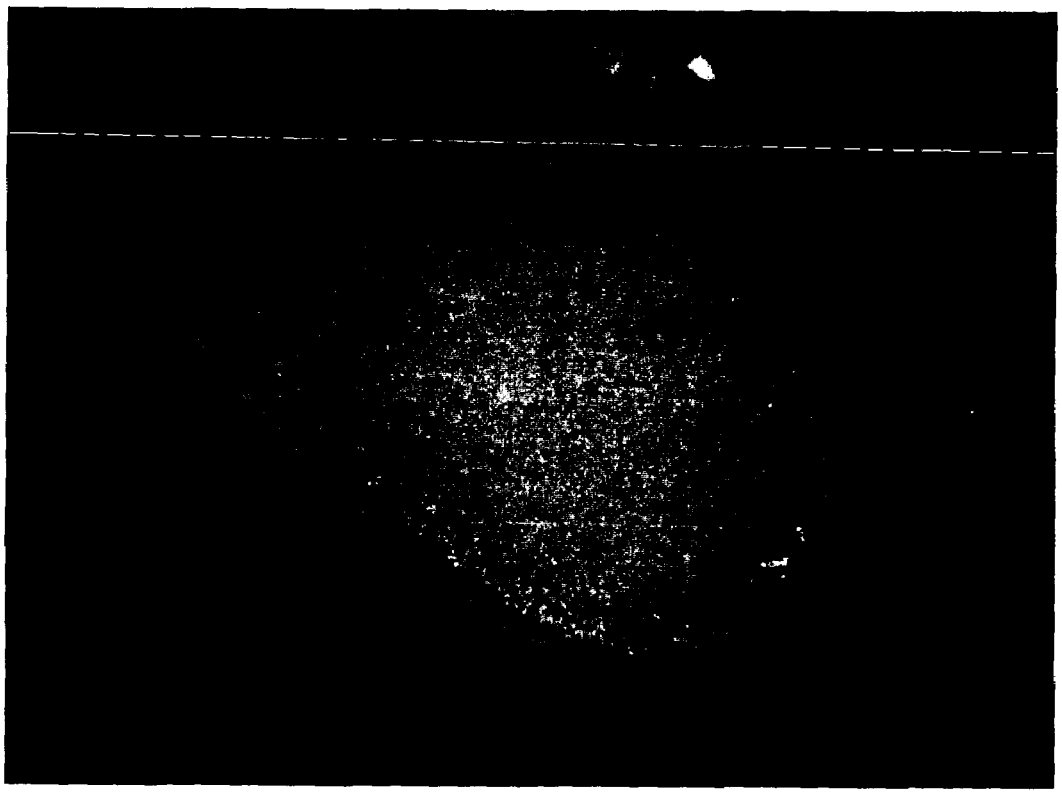
Figure 16:
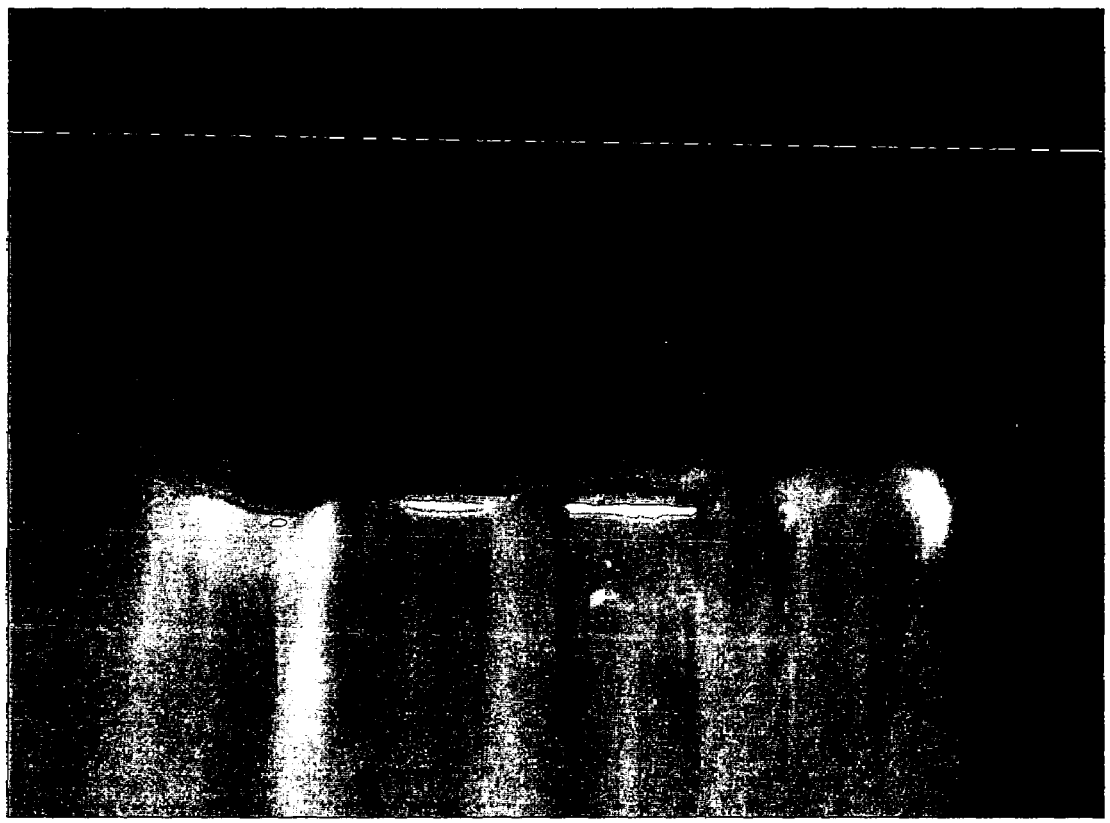
Figure 17:
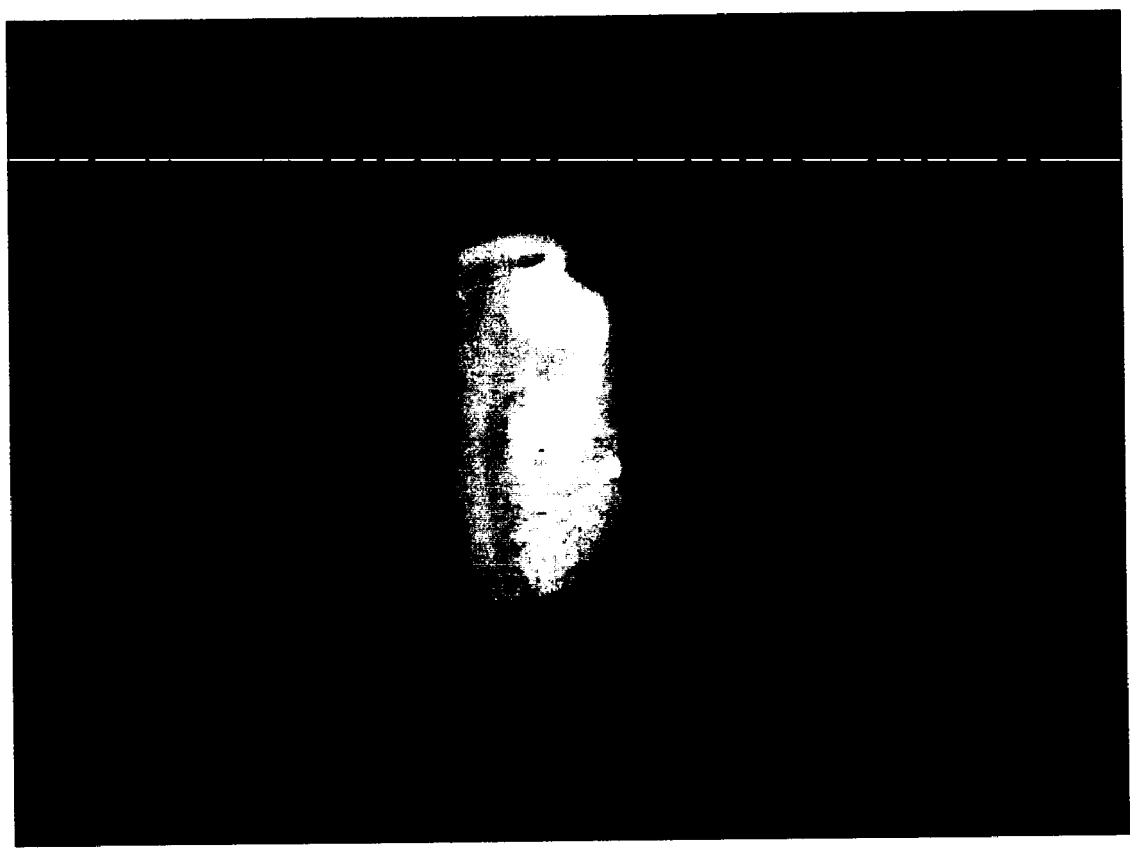
FIGS. 17 and 18 are respectively sectional and perspective views of an optical fiber having had its end squared off with the method of the present invention.
Figure 18:

FIGS. 17 and 18 show how an optical fiber can be squared using the process of the present invention and more specifically that shown in FIGS. 14–16.

The teachings of the present invention can also be applied to treating optical fiber connectors.

Optical fibre connectors are well known in the art. They are treated by mechanically cutting and polishing the connector.

Figure 19:
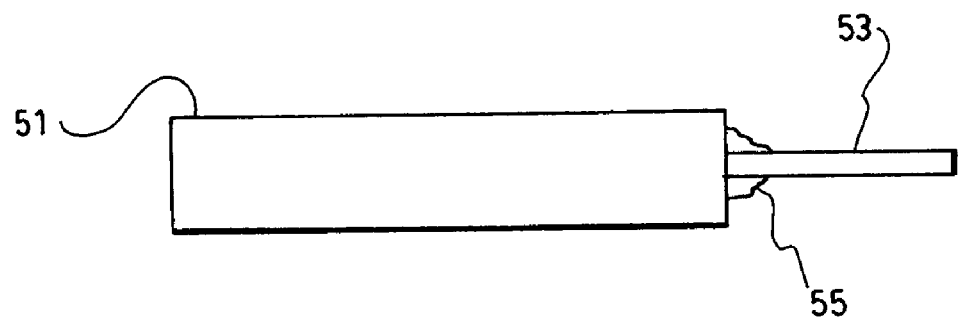
FIG. 19 is a representation of a ferrule having an optical fiber extending from its face and having residual epoxy.

Using the present invention, the connector can now be treated with a laser, providing an all-laser solution. FIG. 19 shows a typical ferrule 51 having an optical fiber 53 extending therefrom, where a residue, as commonly occurs, of epoxy is present. It is necessary to remove this excess epoxy if present and to cut and polish the fiber.

Figure 20:
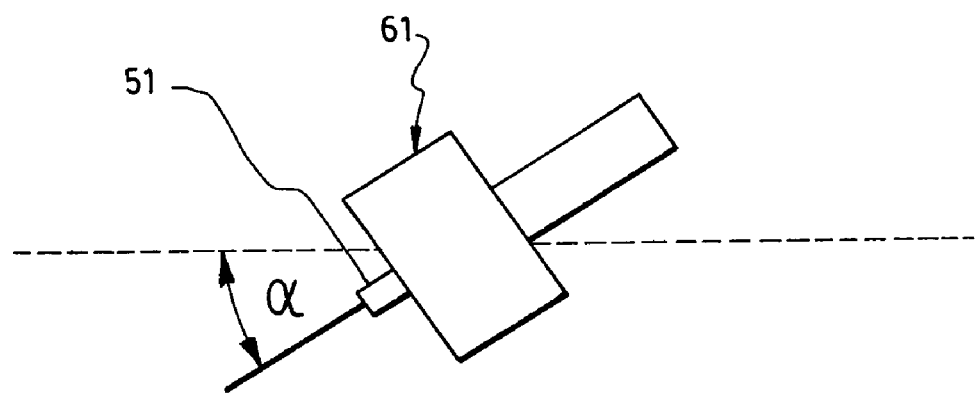
FIG. 20 illustrates the ferrule and fiber and the direction of the laser beam.
Figure 21A:
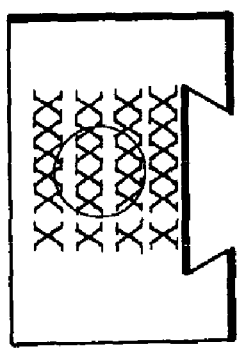
FIGS. 21a and 21b illustrate the pattern for the laser beam to sweep the face of the ferrule or step across it, respectively.
Figure 21B:
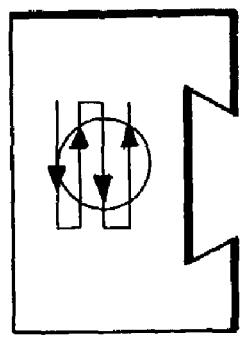
Figure 22:
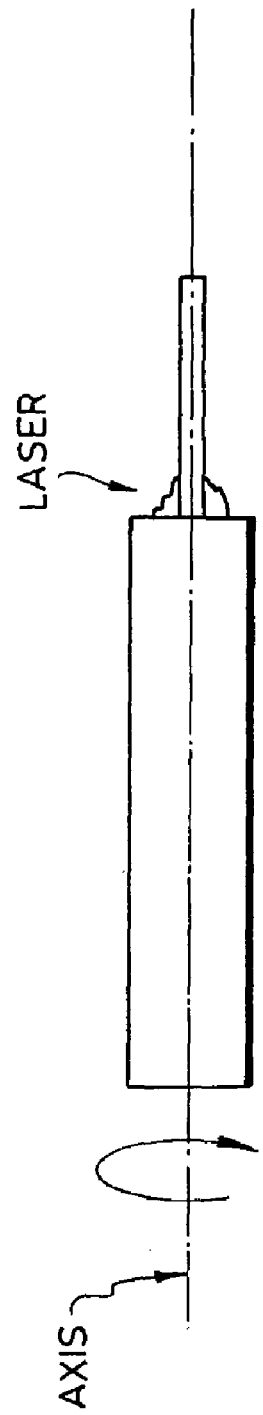
FIG. 22 illustrates ablating the residual epoxy by directing the laser beam at a grazing angle.

Referring now to FIG. 20, there is shown the ferrule 51, optical fiber connector 61 and the direction of the laser beam making an angle $\alpha$ the optical fiber axis. A preliminary cut is made, to shorten the fiber to a predetermined length, (i.e. approximately 0.5 mm) from the face of the ferrule using techniques well known in the art. Then, a laser is activated at a normal incidence ($\alpha=0$) to selectively ablate the residual epoxy if present by sweeping the laser beam (at a selected speed and power density) or stepping it across the face of the ferrule (at a selected power density) (see FIG. 21*a* and 21*b*). At this point, the power density of the laser beam is low, so that the laser does not affect the fiber extending from the ferrule, nor does it affect the ferrule. Alternatively, the residual epoxy can be ablated by rotating the ferrule about its longitudinal axis, and directing the laser beam perpendicularly to the axis of rotation ($\alpha=90°$, see FIG. 22).

The laser beam is then placed at normal incidence, and is activated to etch the end of the fiber using the method of the present invention so that almost no fiber projects from the face of the ferrule. This leaves the surface of the fiber intrinsically polished.

Advantageously, the steps of preliminary cutting the fiber, ablating the residual epoxy and etching the protruding fiber end using the method of the present invention can be accomplished in an all-laser process.

Figure 23A:
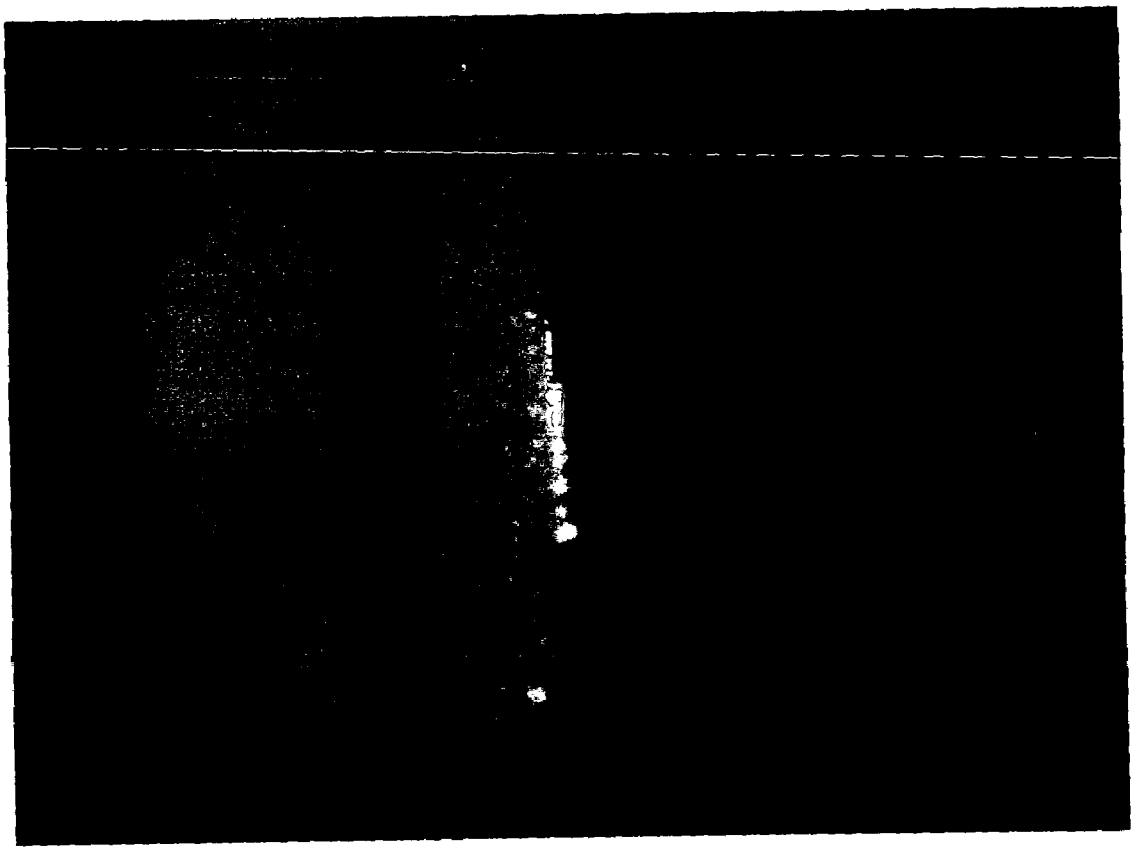
FIGS. 23a and 23b are front and side photographs, respectively, of a ceramic ferrule treated according to an embodiment of the present invention.
Figure 23B:

FIGS. 23*a* and 23*b* show respectively a front view and a side view of a ceramic ferrule treated according to the present invention. It will be appreciated that the fiber is polished and is almost perfectly flush with the face of the ferrule.

It will be understood that an all-laser treatment for an optical fiber connector resembles the process for sculpting the end of an optical fiber, where, as in the above example, the end of the fiber is flush with the surface of the ferrule. Other applications may require a different shape for the end of the fiber, such as wedged, angled, etc. which can also be obtained following the teachings of the present invention.

Figure 24:
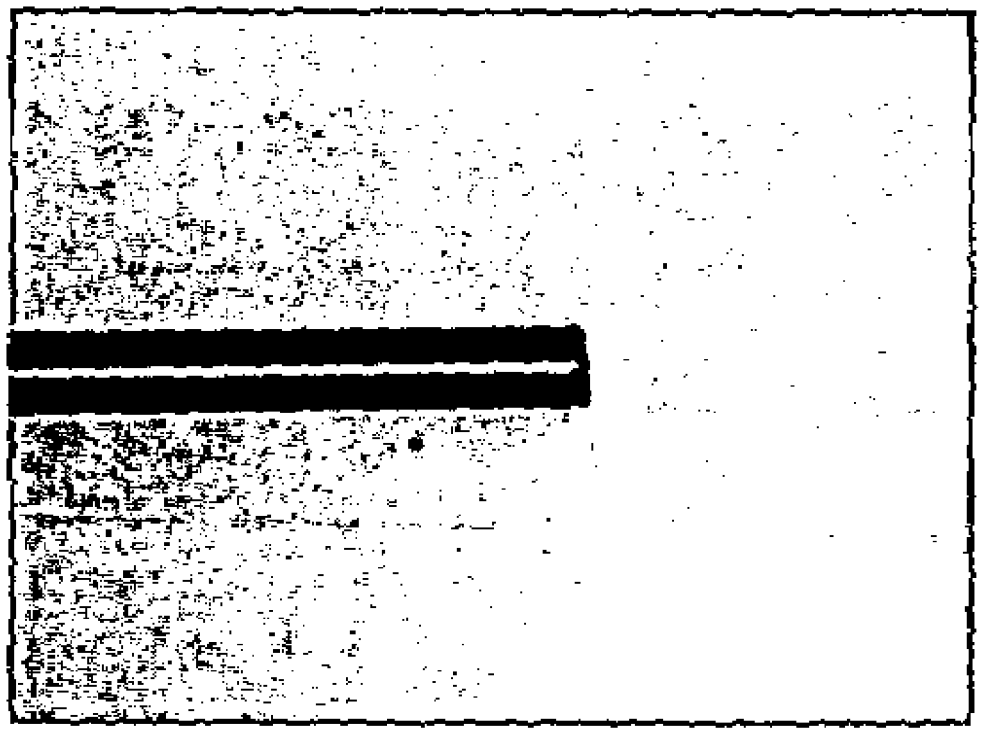
FIG. 24 shows an optical fiber cut at a 9° angle with respect of the normal face of the fiber using laterally spaced V-grooves.

In this respect, reference is made to FIG. 24, showing a fiber having its end-face at a 9° angle with respect to normal incidence, obtained by laterally spacing a plurality of V-grooves.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A method for engraving materials, comprising:
    (a) providing a material to be engraved said material being isotropic and substantially amorphous;
    (b) providing a laser device in an uncontrolled atmosphere, said laser device generating a continuous wave light beam having a substantially Gaussian radial profile and being adapted to be moved at a selected speed relative to said material to be engraved and continuously activated with a selected power density and a selected Gaussian beam radius; and
    (c) actuating said laser device, directing said continuous wave light beam having a substantially Gaussian radial profile on said material and moving said laser beam at a predetermined speed relative to said material in order to provide at least one V-groove therein of a predetermined length, depth and width.

2. A method according to claim 1, wherein said material is fused silica and wherein said laser device is a $CO_2$ laser.

3. A method according to claim 1, wherein said laser device is actuated and the laser beam moved relative to the substrate material to provide two V-grooves, one of said V-grooves being laterally spaced from the other of said V-grooves.

4. A method according to claim 1, wherein said step (c) is repeated at least three times and where a relative angle between said material and said laser beam for each of said repetitions of said step (c) is varied.

5. A method according to claim 2, wherein said material is an optical fiber.

6. A method according to claim 1, wherein said step (c) is repeated a number of times, each times said V-grooves being laterally spaced from each other, so that the resulting etch is substantially planar.

7. A system for engraving a material which is isotropic and generally amorphous, said system being used in an uncontrolled atmosphere, comprising:
    (a) a holder for holding said material;
    (b) a controllable laser device, said laser device generating a continuous wave light beam having a substantially Gaussian radial profile, said light beam being controllable at least in speed of the movement relative to the surface of the material to be engraved, orientation relative to the surface to be engraved, power density and beam radius, and possibly polarization; and
    (c) means for controlling said laser device and directing said continuous wave light beam having a substantially Gaussian radial profile on said material whereby when said material is in said holder, at least one V-groove can be etched therein, the depth and angle at the top of said V-groove being obtained by controlling said laser device.

8. An all optical method for treating an optical fiber connector in an uncontrolled atmosphere, comprising the steps of:
    (a) providing an optical fiber connector having a ferrule, said ferrule having a face and an optical fiber extending therefrom, said optical fiber being held in said ferrule by any means known in the art, in particular with epoxy or any other glue, a residue of which might be present on said face;
    (b) cutting said optical fiber near said face;
    (c) providing a laser device, said laser device generating a continuous wave light beam having a substantially Gaussian radial profile and being adapted to be moved at a selected speed relative to said material to be engraved and continuously activated with a selected power density and a selected Gaussian beam radius;

(d) directing said continuous wave light beam having a substantially Gaussian radial profile of said laser device towards said face of the ferrule at a normal incidence;

(e) actuating said laser device and moving the beam of said laser device relative to said face of the ferrule in order to selectively ablate the residue of epoxy if present on said face of the ferrule;

(f) directing said continuous wave light beam having a substantially Gaussian radial profile of said laser device towards said face of the ferrule at a normal incidence; and (g) terminating said optical fiber connector by actuating said laser beam on the end face of said optical fiber protruding from the face of the ferrule in order to etch a plurality of V-grooves, so that almost no fiber projects from said face of the ferrule in order to provide a substantially planar surface.

9. A method according to claim 6, wherein said material is fused silica, kind said laser is a $CO_2$ laser.

10. A method according to claim 6, wherein said material is an optical fiber.

* * * * *